(12) United States Patent
Tang

(10) Patent No.: US 11,008,182 B2
(45) Date of Patent: May 18, 2021

(54) ROTATABLE TRAY MECHANISM, ROBOT AND DEVICE

(71) Applicant: BEIJING GEEKPLUS TECHNOLOGY CO., LTD., Beijing (CN)

(72) Inventor: Yan Tang, Beijing (CN)

(73) Assignee: BEIJING GEEKPLUS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/393,902

(22) Filed: Apr. 24, 2019

(65) Prior Publication Data

US 2019/0248601 A1 Aug. 15, 2019

Related U.S. Application Data

(63) Continuation of application No. PCT/CN2018/095446, filed on Jul. 12, 2018.

(30) Foreign Application Priority Data

Dec. 13, 2017 (CN) .......................... 201711329537.2

(51) Int. Cl.
*B65G 47/96* (2006.01)
*B07C 3/02* (2006.01)
*B65G 47/74* (2006.01)

(52) U.S. Cl.
CPC .............. *B65G 47/962* (2013.01); *B07C 3/02* (2013.01)

(58) Field of Classification Search
None
See application file for complete search history.

(56) References Cited

U.S. PATENT DOCUMENTS

| 573,987 | A | * | 12/1896 | Layton | ...................... | B60P 1/14 |
| | | | | | | 298/9 |
| 1,819,411 | A | * | 8/1931 | Flowers | .................. | B60P 1/165 |
| | | | | | | 298/17.7 |
| 4,174,773 | A | * | 11/1979 | Venzke | ................ | B65G 47/962 |
| | | | | | | 198/370.04 |
| 6,082,827 | A | * | 7/2000 | McFall | ................ | B65G 47/967 |
| | | | | | | 298/17.6 |
| 9,409,726 | B2 | * | 8/2016 | Pape | .................... | B65G 17/345 |
| 2017/0362041 | A1 | * | 12/2017 | Mader | .................... | B65G 47/40 |

\* cited by examiner

*Primary Examiner* — Kavel Singh

(57) ABSTRACT

A rotatable tray mechanism includes a base, a rotatable tray, and a revolute pair assembly and an actuating unit arranged between the base and the rotatable tray. At least one of the rotatable tray and the base includes a revolving shaft arranged on at least one edge. The revolute pair assembly is arranged on at least one of the base and the rotatable tray and is at a location opposite to the revolving shaft. One revolving shaft mates with at least one revolute pair assembly including a revolute pair and an enable mechanism, wherein the revolute pair has a first state and a second state. The enable mechanism is enabling the revolute pair to switch over between the first state and the second state. When the revolute pair is in the first state, the rotatable tray rotates with respect to the base by taking the revolving shaft as a rotating shaft and taking the revolute pair as support of the revolving shaft when the actuating unit applies an acting force, wherein the direction of the acting force applying the rotatable tray is a direction far away from the base.

11 Claims, 7 Drawing Sheets

ROTATABLE TRAY MECHANISM, ROBOT AND DEVICE

CROSS-REFERENCE TO RELATED APPLICATIONS

The present disclosure claims priority to Chinese Patent Application No. 201711329537.2, titled "ROTATABLE TRAY MECHANISM, ROBOT AND DEVICE" and filed on Dec. 13, 2017, the entire contents of which are incorporated herein by reference.

TECHNICAL FIELD

The present disclosure relates to the field of intelligent logistics, and for example, to a rotatable tray mechanism, a sorting robot, and a device.

BACKGROUND

Parcel sorting robot systems are logistics sorting systems emerging based on China's national situations and geographical factors in overall consideration of balance of China's labor intensive industry human costs and costs of sophisticated automatic devices. Taking advantage of immediate response of robots and flexibility of distributed systems, the parcel sorting robot systems can greatly reduce comprehensive costs of parcel sorting.

However, rotatable trays of these parcel sorting robots are single in function and poor in adaptability, which has a negative effect on sorting efficiency of the sorting robots to a certain extent.

SUMMARY

The present disclosure provides a rotatable tray mechanism, a sorting robot, and a device. By arranging a revolute pair assembly, flexibility of the rotatable tray mechanism may be increased. Therefore, the present disclosure has a better application prospect.

A rotatable tray mechanism includes a base, a rotatable tray, and a revolute pair assembly and an actuating unit arranged between the base and the rotatable tray. At least one of the rotatable tray and the base includes a revolving shaft arranged on at least one edge. The revolute pair assembly is arranged on at least one of the base and the rotatable tray and is at a location opposite to the revolving shaft. One revolving shaft mates with at least one revolute pair assembly including a revolute pair and an enable mechanism, wherein the revolute pair has a first state and a second state. The enable mechanism is enabling the revolute pair to switch over between the first state and the second state. When the revolute pair is in the first state, the rotatable tray rotates with respect to the base by taking the revolving shaft as a rotating shaft and taking the revolute pair as support of the revolving shaft when the actuating unit applies an acting force, wherein the direction of the acting force applying the rotatable tray is a direction far away from the base.

In one embodiment, the revolute pair comprises a mounting end fixedly arranged on at least one of the base and the rotatable tray and a mating end mating with the enable mechanism and providing rotational support for the rotatable tray.

In one embodiment, the mating end of the revolute pair comprises a first arc-shaped structure mating with the revolving shaft and providing rotational support for the revolving shaft, and the revolving shaft is housed in an intrados of the first arc-shaped structure.

In one embodiment, a part in the revolving shaft mating with the first arc-shaped structure fits with the intrados of the first arc-shaped structure.

In one embodiment, a cross section of the revolving shaft is a circle with a first diameter, the intrados is a circular arc surface with a second diameter, and wherein the first diameter is less than the second diameter.

In one embodiment, the enable mechanism comprises a fixed end fixedly arranged on at least one of the base and the rotatable tray and a movable end mating with the revolute pair and configured to switch a state of the revolute pair.

In one embodiment, the movable end comprises any one of an arc-shaped structure, a T-shaped structure, a V-shaped structure, and an L-shaped structure.

In one embodiment, the movable end of the enable mechanism comprises a second arc-shaped structure, the second arc-shaped structure is configured to move between a first position and a second position and mate with the first arc-shaped structure when the second arc-shaped structure moves to the first position to form an annular seat supporting the revolving shaft and being available for the revolving shaft to rotate, and the revolute pair is in the first state at this moment; an opening of the annular seat gradually becomes larger when the second arc-shaped structure moves from the first position to the second position; and the second arc-shaped structure is entirely separated from the first arc-shaped structure when the second arc-shaped structure moves to the second position, and the revolute pair is in the second state at this moment.

In one embodiment, the second arc-shaped structure mates with the first arc-shaped structure by means of latching, the revolute pair is in the second state when the second arc-shaped structure is latched with the first arc-shaped structure, and the revolute pair is in the first state when the second arc-shaped structure is separated from the first arc-shaped structure.

In one embodiment, the second arc-shaped structure mates with the first arc-shaped structure by means of stretching and retraction, the revolute pair is in the second state when the second arc-shaped structure entirely retracts into the first arc-shaped structure, and the revolute pair is in the first state when the second arc-shaped structure stretches out of the first arc-shaped structure.

In one embodiment, a central angle corresponding to the annular seat is greater than or equal to 270°.

In one embodiment, at least one edge of the rotatable tray is provided with at least one first opening, and two edge portions forming the first opening in the rotatable tray respectively constitute one said revolving shaft.

In one embodiment, a position of the base closing to a side of the rotatable tray and corresponding to the first opening is respectively provided with two revolute pair assemblies, and the two revolute pair assemblies respectively mate with two revolving shafts constituted by two edge portions of the same first opening.

In one embodiment, the base has a rectangular box structure, and the rotatable tray is shaped like a rectangle fitting with the opening of the base.

In one embodiment, the rotatable tray comprises four openings arranged close to four corners of the rotatable tray, and each edge of the base closing to a side of the rotatable tray is provided with two said revolute pair assemblies.

In one embodiment, the actuating unit is any one of an air cylinder, a hydraulic cylinder, a screw rod, a linear motor, and a linkage mechanism.

A sorting robot includes the above-mentioned rotatable tray mechanism.

A device includes the above-mentioned rotatable tray mechanism.

In the rotatable tray mechanism provided by the present disclosure, by arranging the switchable revolute pair assembly, state switching of the rotatable tray mechanism may be implemented, such that availability of the rotatable tray mechanism is improved.

DETAILED DESCRIPTION

The present disclosure will be described below with reference to the accompanying drawings in this embodiment.

Figure 1:
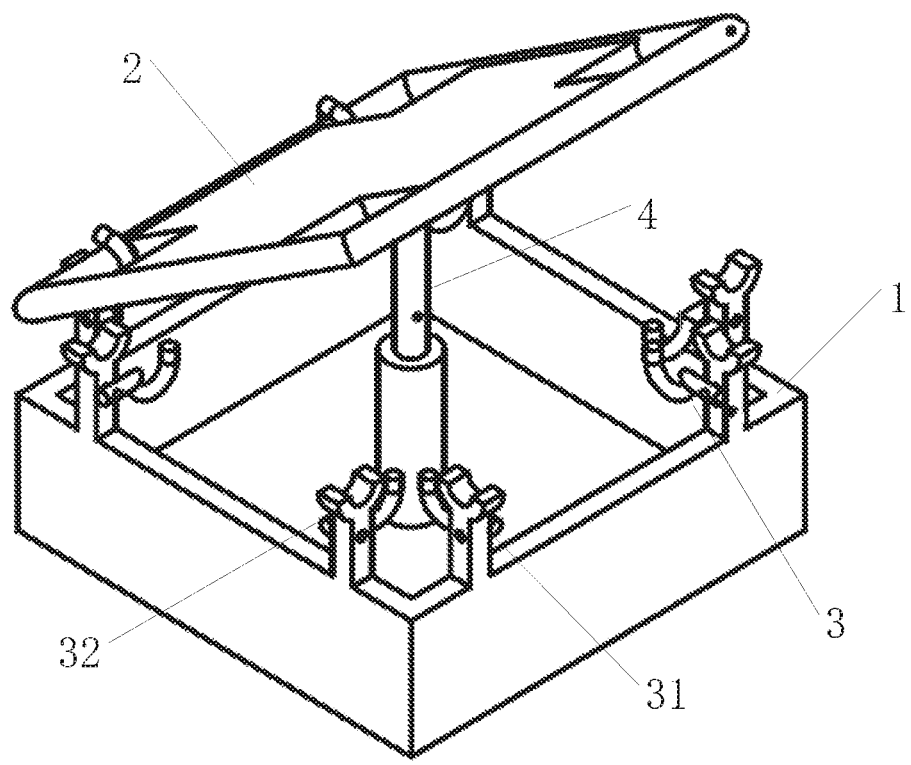
FIG. 1 and FIG. 2 illustrate schematic diagrams of a rotatable tray mechanism according to an embodiment.

This embodiment provides a rotatable tray mechanism. Referring to FIG. 1, the rotatable tray mechanism includes a base 1, a rotatable tray 2, and a revolute pair assembly 3 and an actuating unit 4 arranged between the base 1 and the rotatable tray 2. The actuating unit 4 applies an acting force to the rotatable tray 2 such that the rotatable tray 2 rotates with respect to the base 1. The revolute pair assembly 3 includes a revolute pair 31 and an enable mechanism 32. The revolute pair 31 has a first state and a second state. The enable mechanism 32 is enabling the revolute pair 31 to switch over between the first state and the second state. When the revolute pair 31 is in the first state, the rotatable tray 2 rotates with respect to the base 1 when the actuating unit 4 applies an acting force whose direction is far away from the base 1. In the rotatable tray mechanism provided by this embodiment, by arranging the revolute pair assembly 3 having a switching functionality, rotatable tray effect may be improved.

In one embodiment, the revolute pair 31 is arranged on at least one of the base 1 and the rotatable tray 2, and the enable mechanism 32 is arranged on at least one of the base 1, the rotatable tray 2 and the revolute pair 31.

The revolving shaft may be arranged on the base 1 or the rotatable tray 2, and the revolving shaft also may be formed by a mechanism of the rotatable tray 2 itself. As shown in FIG. 1, a first end of the revolute pair 31 may be arranged (for example, fixedly arranged) on the base 1, and a second end of the revolute pair 31 is arranged to mate with the revolving shaft. Alternatively, the first end of the revolute pair 31 is arranged on the rotatable tray 2, and the second end (the end close to the base) of the revolute pair 31 is arranged to mate with the revolving shaft. Likewise, the enable mechanism 32 may include a fixed end and a movable end. For example, the fixed end may be fixedly arranged on the base or the rotatable tray, and the movable end may implement state switching of the revolute pair 31 by mating with the revolute pair 31. For example, the fixed end also may be arranged on the revolute pair 31, and the movable end is arranged to mate with the revolute pair 31 to implement state switching of the revolute pair 31.

In an embodiment, the enable mechanism 32 may implement switching of rotation of the revolute pair 31 in a variety of ways. For example, the enable mechanism 32 may block the rotation of the revolving shaft to indirectly block the rotatable tray 2 to rotate with respect to the base 1. The enable mechanism 32 may block the rotation of the revolving shaft by means of a latching structure (for example, a latching hoop arranged in the direction of rotation of the revolving shaft), such that the revolute pair 31 is in the second state. For example, this manner is equivalent to a fact that the revolute pair 31 itself can be used for supporting the revolving shaft to rotate. That is, the revolute pair 31 is in the first state in which the rotatable tray 2 may be supported to rotate. In the meanwhile, the rotation of the revolving shaft is limited by means of the latching structure arranged in the direction of rotation of the revolving shaft, such that the revolute pair 31 is disabled, i.e., the revolute pair 31 is in the second state. For example, the enable mechanism 32 also may mate with the revolute pair 31, such that the revolute pair 31 can assist the revolving shaft in rotating. The revolute pair 31 itself does not have a structure supporting the revolving shaft to rotate. When the enable mechanism 32 mates with the revolute pair 31, a structure supporting the revolving shaft to rotate may be formed, such that the revolute pair 31 is in the first state. The structure supporting the revolving shaft to rotate disappears when the enable mechanism 32 is separated from the revolute pair 31, such that the revolute pair 31 may be in the second state.

In one embodiment, referring to FIG. 1, the revolute pair 31 includes a mounting end fixedly arranged on the base 1 and a mating end mating with the rotatable tray 2. The mounting end of the revolute pair 31 is fixedly arranged at the side of the base 1 close to the rotatable tray 2. The mating end may include a U-shaped or arc-shaped structure (FIG. 1 shows an arc-shaped structure), such that the rotatable tray 2 may implement the rotation with respect to the base 1 by means of rotation of the revolving shaft in the U-shaped or arc-shaped structure.

Figure 2:
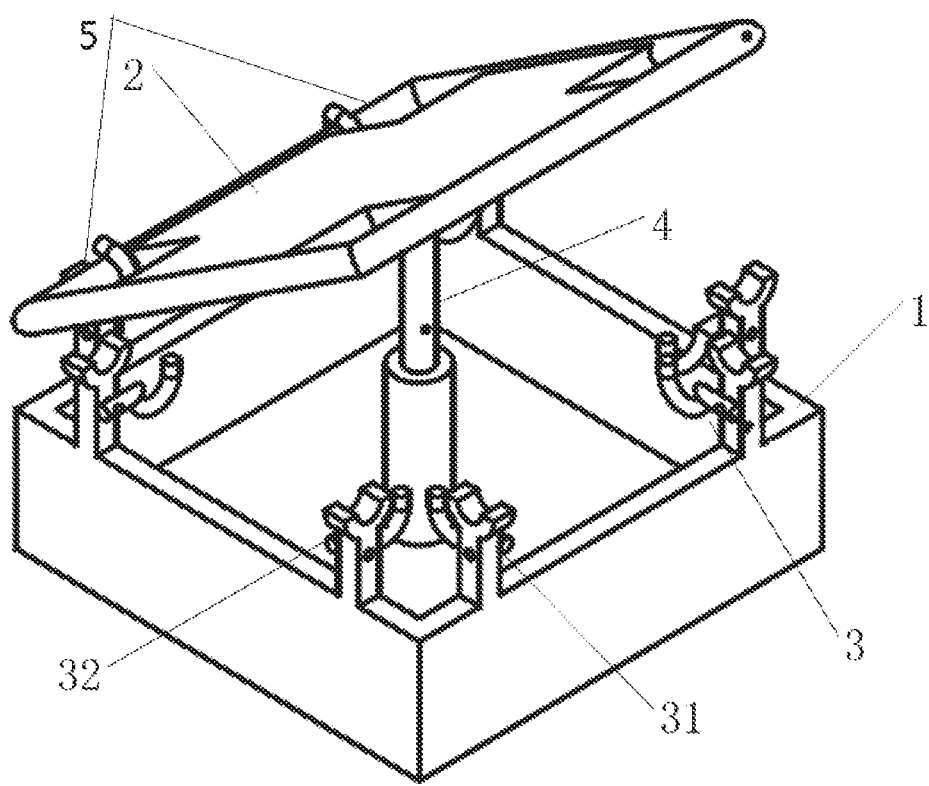

Referring to FIG. 2, the revolving shaft 5 may be arranged on the rotatable tray 2 or the revolving shaft 5 may be a part of the rotatable tray 2 (the revolving shaft as shown in FIG. 2 is a part of the rotatable tray). For example, the revolving shaft 5 may be arranged at the side of the rotatable tray 2 close to the base 1. For example, for the rotatable tray 2 having a rectangular structure, four revolving shafts 5 may be arranged at an edge close to a side of the base. In the meanwhile, the revolute pair 31 is provided at a location on the base 1 corresponding to the four revolving shafts 5. For example, one revolving shaft 5 may correspond to one revolute pair 31 (as shown in FIG. 2). For example, two shorter revolving shafts 5 are arranged at two sides of an edge of each side of the rotatable tray 2. In the meanwhile, a revolute pair 31 is arranged at a corresponding location on the base 1. In this way, materials of the revolving shafts are saved, costs are lowered, and the mass of the rotatable tray 2 is reduced. In an embodiment, one revolving shaft 5 may correspond to two, three or more revolute pairs 31 to improve the stability of rotation of the rotatable tray 2.

Further referring to FIG. 2, as mentioned above, the mating end of the revolute pair 31 may include a first arc-shaped structure supporting the revolving shaft 5 to rotate. For example, the revolving shaft 5 may be arranged in the intrados of the first arc-shaped structure, such that the rotatable tray 2 may rotate with respect to the base 1 by means of the revolving shaft 5. In an embodiment, the axial direction of the revolving shaft 5 is perpendicular to a plane where the arc-shaped structure is, such that an outer surface of the revolving shaft 5 may come into contact with an inner surface of the arc-shaped structure, and the revolving shaft 5 may flexibly move on the inner surface of the arc-shaped structure when the rotatable tray 2 rotates. For example, a part in the revolving shaft 5 mating with the first arc-shaped structure may fit with the intrados of the first arc-shaped structure. For example, a cross section of the revolving shaft 5 is a circle and has a first diameter, the intrados is a circular arc surface and has a second diameter, and the first diameter is less than the second diameter. In this embodiment, the diameter of the cross section of the revolving shaft is less than that of the intrados of the arc-shaped structure, which may ensure the rotation of the revolving shaft in the intrados, prevent the revolving shaft from getting stuck, and improve reliability of the rotatable tray mechanism.

For example, the mating end of the revolute pair 31 may include a bearing structure, and the revolving shaft may pass through a rotating part of the bearing structure, such that the revolving shaft may mate with the bearing structure to implement the rotation of the revolving shaft. In this embodiment, by using the bearing structure, resistance against the rotation of the revolving shaft may be reduced, and the flexibility of the rotatable tray mechanism may be improved.

Figure 3A:
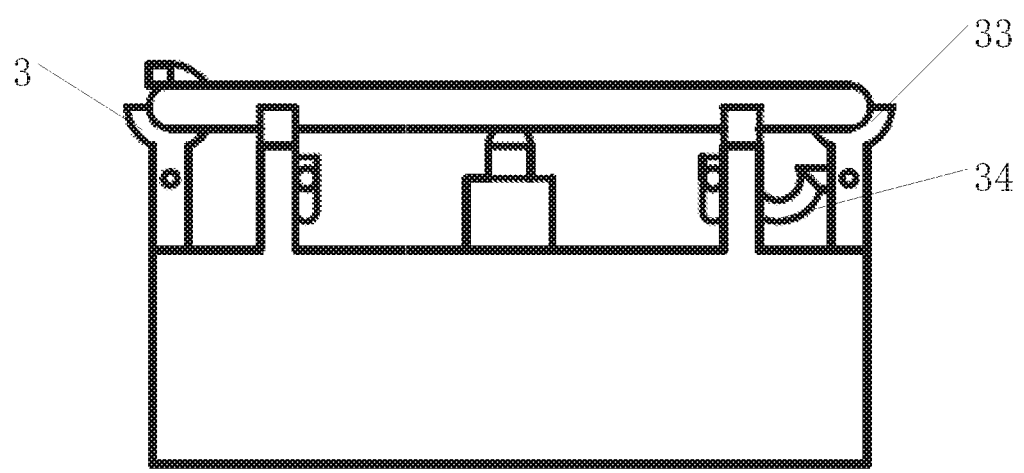
FIG. 3a-FIG. 3c illustrate schematic diagrams of a revolute pair assembly according to an embodiment.

As previously mentioned, in some embodiments, the enable mechanism 32 may mate with the revolute pair 31, such that the revolute pair 31 is in the first state. Referring to FIG. 3a, for example, one end of the revolute pair 31 may include a first arc-shaped structure 33 (for example, a radian of the first arc-shaped structure may be less than 180°, and the outer surface of the revolving shaft is similar to the intrados of the first arc-shaped structure, such that when the rotatable tray 2 rotates toward a direction far away from the base 1, the revolving shaft 5 may be divorced from the intrados of the first arc-shaped structure, i.e., the first arc-shaped structure 33 itself is unable to support the rotation of the revolving shaft 5). The enable mechanism 32 may include a second arc-shaped structure 34. The second arc-shaped structure 34 is configured to move between a first position and a second position and mate with the first arc-shaped structure 33 when the second arc-shaped structure 34 moves to the first position to form an annular seat fit for the revolving shaft 5 to rotate, such that the revolute pair 31 is in the first state. That is, when the second arc-shaped structure 34 moves to the first position, the second arc-shaped structure 34 and the first arc-shaped structure 33 of the revolute pair 31 exactly form an annular or approximately annular structure (FIG. 3A shows an approximately annular structure), such that the intrados of the revolute pair 31 and the intrados of the second arc-shaped structure 34 form an annular seat, which may limit the rotation of the revolving shaft 5 within the annular seat itself, and thus preventing the revolving shaft 5 from being divorced from the annular seat during the rotation. Likewise, the opening of the formed annular seat may gradually become larger when the second arc-shaped structure 34 moves to the second position, and the second arc-shaped structure 34 may be entirely separated from the first arc-shaped structure 33 of the revolute pair 31 when the second arc-shaped structure 34 moves to the second position, such that the revolute pair 31 returns to the second state, i.e., the state in which the rotation of the revolving shaft 5 cannot be supported.

In this embodiment, for example, the second arc-shaped structure 34 of the enable mechanism 2 may include a plurality of structures that may mate and connect with the revolute pair 31, such that the opening of the annular seat formed by the second arc-shaped structure 34 and the first arc-shaped structure 33 may continuously change in size. For example, the second arc-shaped structure 34 may mate with the first arc-shaped structure 33 by means of a latching structure to implement continuous adjustment of the opening size of the annular seat. For another example, the second arc-shaped structure 34 also may be nested into the first arc-shaped structure 33, that is, the second arc-shaped structure 34 and the first arc-shaped structure 33 form a telescopic structure. The revolute pair 31 is in the second state when the second arc-shaped structure 34 entirely retracts into the first arc-shaped structure 33. Likewise, the revolute pair 31 is in the first state when the second arc-shaped structure 34 stretches out of the first arc-shaped structure 33. As mentioned above, the annular seat may have different openings by adjusting amount of stretching of the second arc-shaped structure 34.

As previously mentioned, the fixed end of the enable mechanism 32 may be arranged on at least one of the revolute pair 31, the rotatable tray 2 and the base 1, such that the movable end of the enable mechanism 32 may enable or limit the rotation of the rotatable tray (for example, by limiting or enabling the rotation of the revolving shaft). The enable mechanism 32 as shown in FIG. 3a is fixed to the revolute pair 31.

Figure 3B:
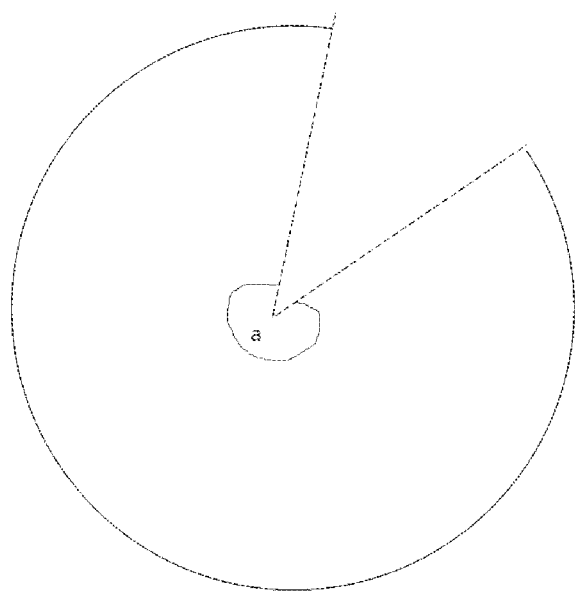

Referring to FIG. 3b, in the foregoing embodiment, for example, the central angle a corresponding to the annular seat is greater than or equal to 270°. That is, when the second arc-shaped structure 34 mates with the first arc-shaped structure 33 to form the annular seat, the formed annulus may be an annulus of 360° or may be an annulus having a certain central angle a. For example, to prevent the revolving shaft 5 from being divorced from the annular seat during the rotation, the central angle a of the annular seat may be ensured to satisfy the above requirements for the central angle.

Figure 3C:
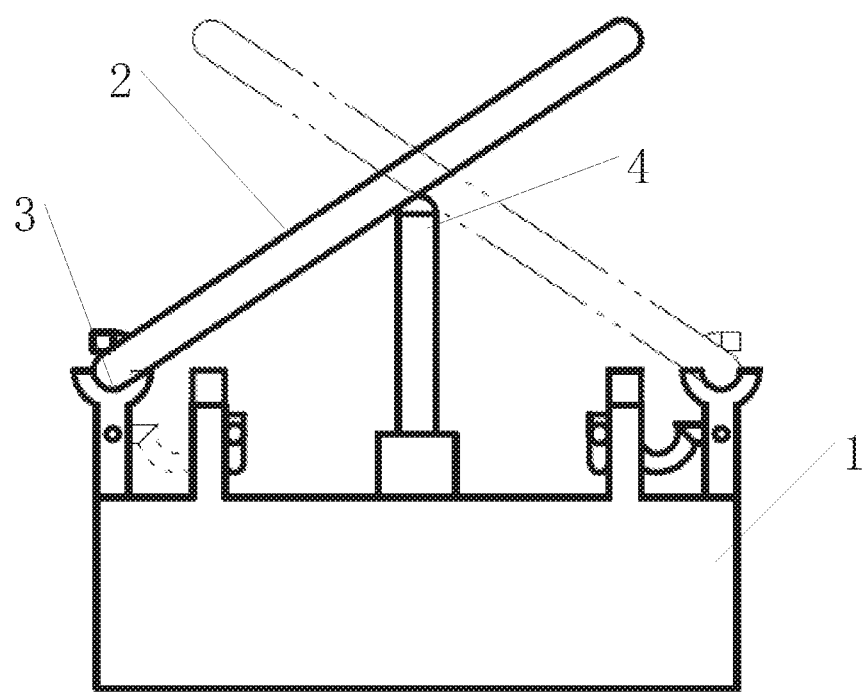

FIG. 3c schematically illustrates that under the action of the actuating unit 4, the rotatable tray 2 rotates to a direction far away from the base 1 in the event that the enable mechanism 32 according to this embodiment is adopted.

As previously mentioned, in some above-mentioned embodiments, the enable mechanism 32 may include a latching member. The latching member is latched to the revolute pair 31 such that the revolute pair 31 is in the second state, and the revolute pair 31 is in the first state when the latching member is separated from the revolute pair 31. The latching member may be of a U-shaped structure, a T-shaped structure, a V-shaped structure, and an L-shaped structure, etc. For example, for the U-shaped or V-shaped latching member, the opening part of the latching member may be latched to the first arc-shaped structure 33 of the revolute pair 31 in width along an axial direction to limit the rotation of the revolving shaft 5 within the intrados of the first arc-shaped structure 33. For example, for the T-shaped or L-shaped latching member, the intrados of the first arc-shaped structure 33 of the revolute pair 31 may be provided with a latching slot or a latching hole penetrating through the intrados, such that one side of the latching member is inserted into the latching slot or the latching hole to limit the rotation of the revolving shaft 5 within the intrados of the first arc-shaped structure 33 of the revolute pair 31. For example, a groove or a through hole may be arranged on the revolving shaft 5, such that one end of the latching member is inserted into the groove or the through hole, and the other end of the latching member is fixed to, for example, the base 1 so as to limit the rotation of the revolving shaft 5 within the intrados of the first arc-shaped structure 33. Although the embodiments of the present disclosure provide some embodiments with regard to latching manners of limiting the rotation of the revolving shaft, the latching manners of the present disclosure are not limited to these descriptions.

Figure 4A:
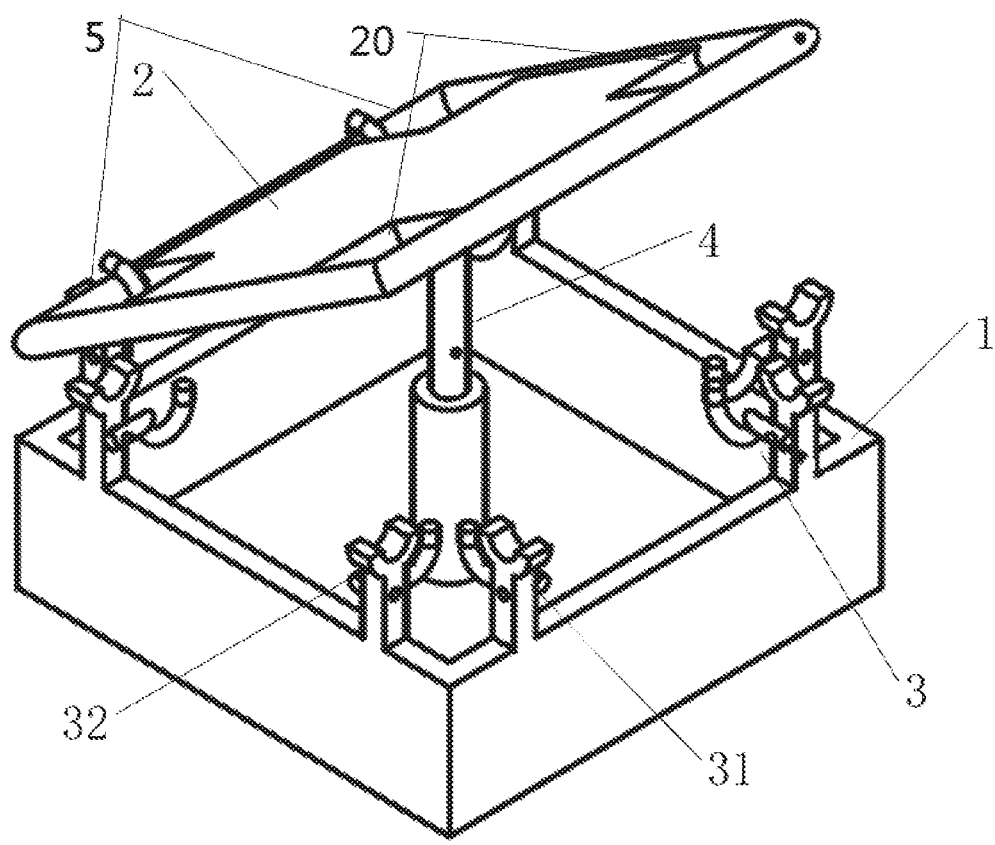
FIG. 4a-FIG. 4b illustrate schematic diagrams of a rotatable tray mechanism taking an opening of a rotatable tray as a revolving shaft according to an embodiment.

Referring to FIG. 4a, in some embodiments, the rotatable tray 2 includes a first opening 20 arranged along an edge of the rotatable tray 2, wherein the edge part of the rotatable tray 2 forming the first opening 20 constitutes the revolving shaft 5. For example, an opening may be arranged nearby each edge close to the rotatable tray 2 (FIG. 4 schematically illustrates four openings arranged at the edge of the rotatable tray), and these openings may be arranged, for example, correspondingly with respect to the revolute pair 31. For example, one or more revolute pairs 31 may correspond to one opening 20. In an embodiment, the objective of trepanning is to form the revolving shaft 5. Therefore, the opening 20 needs to be arranged at the edge of the rotatable tray 2, and the objective of arranging a plurality of openings 20 along the edge of the rotatable tray 2 is to form a plurality of revolving shafts 5 along the edge of the rotatable tray 2, such that the rotatable tray 2 may mate with the revolute pair 31 by means of these revolving shafts 5 to implement the rotation of these revolving shafts 5 with respect to the base 1. For example, the cross sections of these revolving shafts 5 may be circular so as to ensure that these revolving shafts 5 may flexibly rotate on the revolute pair 31. In the rotatable tray mechanism provided by this embodiment, by forming the revolving shaft 5 on the rotatable tray 2, adding new parts is avoided, such that the rotatable tray mechanism has a compact structure, installation reliability is increased, and manufacturing costs of the rotatable tray mechanism are reduced.

Likewise, as previously mentioned, the revolving shaft 5 also may be an individual component fixed to the rotatable tray 2 or the base 1. For example, the rotatable tray mechanism includes a plurality of revolute pair assemblies 3 arranged at the edge of the base 1, and the rotatable tray 2 includes a plurality of revolving shafts 5 arranged corresponding to these revolute pair assemblies 3 and along the edge of the rotatable tray 2. Likewise, for example, one or more revolute pair assemblies 3 also may correspond to one revolving shaft 5.

In the foregoing embodiments, a side of the base 1 close to the rotatable tray 2 may include a plurality of edges, and each edge may be provided with at least two revolute pair assemblies 3. The rotatable tray 2 includes a plurality of openings 20 or revolving shafts 5 corresponding to the revolute pair assemblies 3. In the rotatable tray mechanism provided by this embodiment, each edge of the rotatable tray 2 is along two corresponding revolute pair assemblies 3, such that reliable rotation of the rotatable tray 2 along the direction where each edge is may be implemented.

Figure 4B:
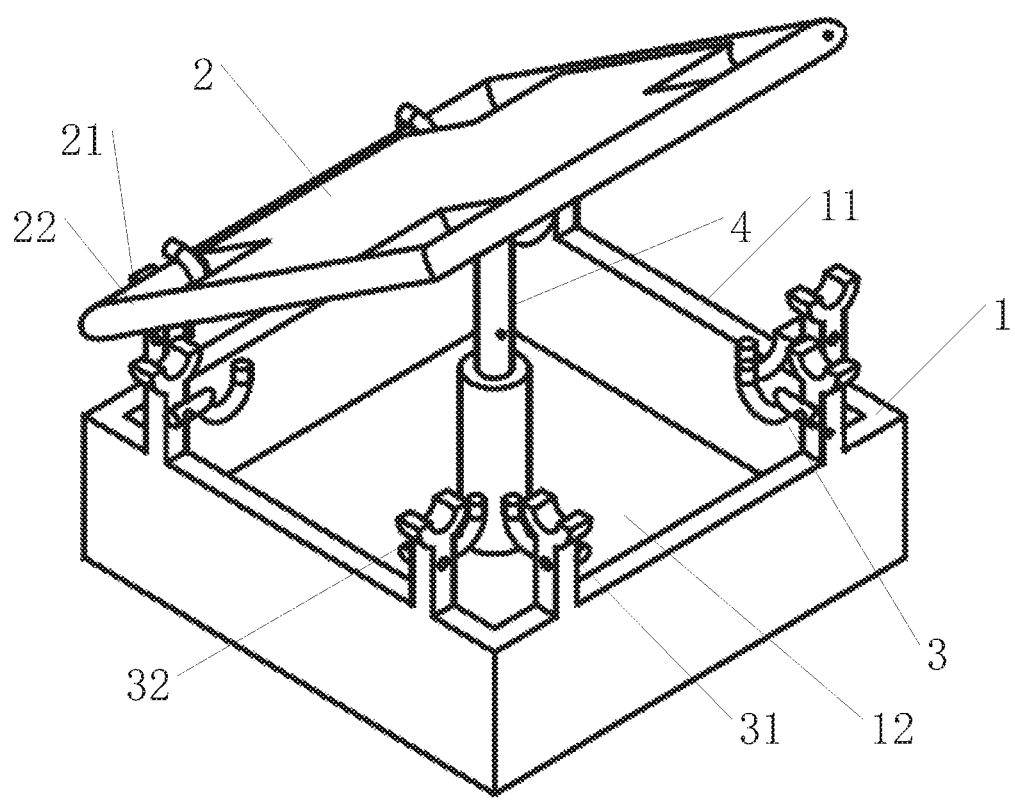

Referring to FIG. 4b, the base 1 may be of a rectangular box structure, which includes a box bottom and an edge portion arranged along the box bottom. A side of the rectangular box for mating with the rotatable tray 2 includes four edges 11. For example, the rotatable tray 2 may be shaped like a rectangle mating with the opening (surrounded by side surfaces of the base) of the base 1. For example, the size of the rectangle may be similar to that of the rotatable tray 2. The rotatable tray 2 includes four openings 20 arranged at four corners close to the rotatable tray. For example, the four openings 20 may be rectangular openings respectively. In this way, two revolving shafts (the two revolving shafts are formed by two edges forming the opening) are formed at each corner of the rotatable tray 2. Each edge 11 of one side of the base 1 close to the rotatable tray 2 is provided with two revolute pairs 31 (for example, the revolute pairs may be the foregoing components including an arch-shaped structure), and the two revolute pairs 31 may be, for example, two endpoints close to the edge 11. For example, distances between the two revolute pairs 31 and the endpoints of the edge may be equal (for example, the two revolute pairs 31 may trisect the edge) to improve the stability of rotation of the rotatable tray 2. Likewise, two revolute pairs 31 at an intersection position of any two adjacent edges close to the base 1 may correspond to the revolving shaft 5 formed by the same opening 20, and one of the revolute pairs 31 may take a first strip-shaped part 21 formed at the edge of the rotatable tray by arranging the opening as the revolving shaft 5, and the other one of the revolute pairs 31 may take a second strip-shaped part 22 formed at the edge of the rotatable tray by the opening 20 as the revolving shaft 5. In an embodiment, although two revolute pairs 31 of an intersection point of two edges close to the base 1 correspond to the same opening 20, the rotation of the rotatable tray 2 is implemented based on two or more revolute pairs 31 arranged at the same edge.

In some embodiments, the revolving shaft also may be arranged on one side of the base 1 close to the rotatable tray 2. For example, the revolving shaft is fixed to the base, a first end of the revolute pair 31 is fixed to the rotatable tray, and a second end of the revolute pair 31 mates with the revolving shaft to implement the rotation of the rotatable tray. For example, the mating end of the revolute pair also may be an arc-shaped structure of the intrados mating with an outer side of the revolving shaft. Therefore, the rotatable tray may drive the mounting end of the revolute pair to move under stress, and thus may drive the mating end to move with respect to the revolving shaft to implement the rotation of the rotatable tray with respect to the base. As mentioned above, the enable mechanism may be a latching structure. For example, the revolute pair 31 is provided with an opening penetrating the intrados, the revolving shaft is correspondingly provided with a slot or hole, and the latching structure may be inserted into the hole or the slot to limit the relative rotation between the revolving shaft and the revolute pair, such that the revolute pair is in the second state. Likewise, the enable mechanism 32 also may be arranged to mate with the arc-shaped structure of the revolute pair 31, such that it is avoided separation of the revolving shaft from the arc-shaped structure when the revolving shaft moves with respect to the intrados of the arc-shaped structure. That is, the enable mechanism 32 may implement state switching of the revolute pair 31 in the ways as previously mentioned.

Likewise, the base 1 also may form the revolving shaft mating with the revolute pair 31 by providing a through hole penetrating through the side surface of the base 1. That is, the revolving shaft is formed by providing a through hole on the side surface of the base 1, and reference may be made to the above description.

When the revolving shaft is arranged or formed on the base 1, reference may be made to the above description for a variety of structural changes of the revolute pair assembly 3.

The actuating unit 4 provided by this embodiment may be an air cylinder, a hydraulic cylinder, a screw rod, a linear motor, or a linkage mechanism, etc. The enable mechanism 32 of this embodiment also may be an electromagnet. For example, the movable end of the enable mechanism 32 is provided with an electromagnet, and substance mating with the electromagnet or attractable by the electromagnet is arranged in a rotational stroke of the revolving shaft. In this way, attraction and separation between the enable mechanism 32 and the revolving shaft may be implemented by powering on or powering off the electromagnet. For example, in a power off state, the electromagnet of the enable mechanism 32 may be separated from the rotational stroke of the revolving shaft under the action of a spring, the air cylinder and the hydraulic cylinder, such that the revolute pair 31 is in the first state. Likewise, in a power on state, the electromagnet of the enable mechanism 32 is attracted onto the rotational stroke of the revolving shaft to stop rotation of the revolving shaft, i.e., the revolute pair 31 is kept in the second state. For example, the electromagnet also may be fixed to the base 1, the revolving shaft is arranged on the rotatable tray 2, and the electromagnet may attract and fix the revolving shaft, such that the rotatable tray 2 can be opened with respect to the base 1 around the revolving shaft.

The above embodiments may be combined one to another and have corresponding technical effects.

This embodiment also provides a robot including the above-mentioned rotatable tray mechanism.

This embodiment also provides a device including the above-mentioned rotatable tray mechanism.

What is claimed is:

1. A rotatable tray mechanism, comprising a base, a rotatable tray and a revolute pair assembly and an actuating unit arranged between the base and the rotatable tray; at least one of the rotatable tray and the base comprising a revolving shaft arranged on at least one edge, the revolute pair assembly being arranged on at least one of the base and the rotatable tray and being at a location opposite to the revolving shaft, one revolving shaft mating with at least one revolute pair assembly comprising a revolute pair and an enable mechanism, wherein the revolute pair has a first state and a second state, the enable mechanism enabling the revolute pair to switch over between the first state and the second state; and when the revolute pair is in the first state, the rotatable tray rotates with respect to the base by taking the revolving shaft as a rotating shaft and taking the revolute pair as support of the revolving shaft when the actuating unit applies an acting force, and the direction of the acting force applying the rotatable tray is a direction far away from the base, and wherein the revolute pair comprises a mounting end fixedly arranged on at least one of the base and the rotatable tray and a mating end mating with the enable mechanism and providing rotational support for the rotatable tray, and wherein the mating end of the revolute pair comprises a first arc-shaped structure mating with the revolving shaft and providing rotational support for the revolving shaft, and the revolving shaft is housed in an intrados of the first arc-shaped structure.

2. The rotatable tray mechanism according to claim 1, wherein a part in the revolving shaft mating with the first arc-shaped structure fits with the intrados of the first arc-shaped structure.

3. The rotatable tray mechanism according to claim 2, wherein a cross section of the revolving shaft is a circle with a first diameter, the intrados is a circular arc surface with a second diameter, and wherein the first diameter is less than the second diameter.

4. The rotatable tray mechanism, comprising a base, a rotatable tray and a revolute pair assembly and an actuating unit arranged between the base and the rotatable tray; at least one of the rotatable tray and the base comprising a revolving shaft arranged on at least one edge, the revolute pair assembly being arranged on at least one of the base and the rotatable tray and being at a location opposite to the revolving shaft, one revolving shaft mating with at least one revolute pair assembly comprising a revolute pair and an enable mechanism, wherein the revolute pair has a first state and a second state, the enable mechanism enabling the revolute pair to switch over between the first state and the second state; and when the revolute pair is in the first state, the rotatable tray rotates with respect to the base by taking the revolving shaft as a rotating shaft and taking the revolute pair as support of the revolving shaft when the actuating unit applies an acting force, and the direction of the acting force applying the rotatable tray is a direction far away from the base, and wherein the enable mechanism comprises a fixed end fixedly arranged on at least one of the base and the rotatable tray and a movable end mating with the revolute pair and configured to switch a state of the revolute pair, and wherein the movable end comprises any one of an arc-shaped structure, a T-shaped structure, a V-shaped structure, and an L-shaped structure.

5. The rotatable tray mechanism according to claim 4, wherein the movable end of the enable mechanism comprises a second arc-shaped structure, the second arc-shaped structure is configured to move between a first position and a second position and mate with the first arc-shaped structure when the second arc-shaped structure moves to the first position to form an annular seat supporting the revolving shaft and being available for the revolving shaft to rotate, and the revolute pair is in the first state at this moment; an opening of the annular seat gradually becomes larger when the second arc-shaped structure moves from the first position to the second position; and the second arc-shaped structure is entirely separated from the first arc-shaped structure when the second arc-shaped structure moves to the second position, and the revolute pair is in the second state at this moment.

6. The rotatable tray mechanism according to claim 5, wherein the second arc-shaped structure mates with the first arc-shaped structure by means of latching, the revolute pair is in the second state when the second arc-shaped structure is latched with the first arc-shaped structure, and the revolute pair is in the first state when the second arc-shaped structure is separated from the first arc-shaped structure.

7. The rotatable tray mechanism according to claim 5, wherein the second arc-shaped structure mates with the first arc-shaped structure by means of stretching and retraction, the revolute pair is in the second state when the second arc-shaped structure entirely retracts into the first arc-shaped structure, and the revolute pair is in the first state when the second arc-shaped structure stretches out of the first arc-shaped structure.

8. A rotatable tray mechanism comprising a base, a rotatable tray and a revolute pair assembly and an actuating unit arranged between the base and the rotatable tray; at least one of the rotatable tray and the base comprising a revolving shaft arranged on at least one edge, the revolute pair assembly being arranged on at least one of the base and the rotatable tray and being at a location opposite to the revolving shaft, one revolving shaft mating with at least one revolute pair assembly comprising a revolute pair and an enable mechanism, wherein the revolute pair has a first state and a second state, the enable mechanism enabling the revolute pair to switch over between the first state and the second state; and when the revolute pair is in the first state, the rotatable tray rotates with respect to the base by taking the revolving shaft as a rotating shaft and taking the revolute pair as support of the revolving shaft when the actuating unit applies an acting force, and the direction of the acting force applying the rotatable tray is a direction far away from the base, wherein at least one edge of a flipper is provided with at least one first opening, and two edge portions forming the first opening in the flipper respectively constitute one said revolving shaft.

9. The rotatable tray mechanism according to claim 8, wherein a position of the base close to a side of the flipper and corresponding to the first opening is respectively provided with two revolute pair assemblies, and the two revolute pair assemblies respectively mate with two revolving shafts constituted by two edge portions of the same first opening.

10. The rotatable tray mechanism according to claim 9, wherein the base has a rectangular box structure, and the flipper is shaped like a rectangle fitting with the opening of the base.

11. The rotatable tray mechanism according to claim 10, wherein the flipper comprises four openings arranged close to four corners of the flipper, and each edge of the base closing to a side of the flipper is provided with two said revolute pair assemblies.

\* \* \* \* \*